United States Patent
Vojnovic et al.

(10) Patent No.: US 8,081,581 B2
(45) Date of Patent: Dec. 20, 2011

(54) SAMPLING RULES FOR INFORMATION DISSEMINATION

(75) Inventors: Milan Vojnovic, Cambridge (GB);
Varun Gupta, Pittsburgh, PA (US);
Thomas Karagiannis, Cambridge (GB);
Christos Gkantsidis, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 12/022,902

(22) Filed: Jan. 30, 2008

(65) Prior Publication Data
US 2009/0190599 A1 Jul. 30, 2009

(51) Int. Cl.
*H04L 12/28* (2006.01)
*H04L 12/56* (2006.01)

(52) U.S. Cl. .................... 370/254; 370/400; 709/232

(58) Field of Classification Search .................... None
See application file for complete search history.

(56) References Cited

U.S. PATENT DOCUMENTS

| | | | |
|---|---|---|---|
| 7,080,136 B2 | 7/2006 | Duffield et al. | |
| 7,133,928 B2 | 11/2006 | McCanne | |
| 7,512,097 B2 * | 3/2009 | Jelitto et al. | 370/329 |
| 2003/0088620 A1 | 5/2003 | Kermarrec et al. | |
| 2005/0102299 A1* | 5/2005 | Mair et al. | 707/100 |
| 2006/0098585 A1* | 5/2006 | Singh et al. | 370/252 |
| 2006/0176847 A1 | 8/2006 | Chen et al. | |
| 2006/0239275 A1 | 10/2006 | Zlateff et al. | |
| 2007/0091789 A1 | 4/2007 | Thukral | |
| 2007/0214046 A1 | 9/2007 | Falchuk et al. | |
| 2007/0237080 A1* | 10/2007 | Savagaonkar | 370/235 |
| 2008/0175169 A1* | 7/2008 | Deb et al. | 370/255 |

FOREIGN PATENT DOCUMENTS

WO  WO 2007102096 A1 *  9/2007

OTHER PUBLICATIONS

Riviere, Etienne, et al., "Compositional Gossip: a conceptual architecture for desigining gossip-based applications", ACM Sigops Operating Systems Review, Oct. 2007.*
C. C. Zou, D. Towsley, and W. Gong. "On the Performance of Internet Worm Scanning Strategies," Technical Report TR-03-CSE-07, UMass ECE Dept., Nov. 2003.*
Akdere, et al., "A comparison of epidemic algorithms in wireless sensor networks", Elsevier B. V. 2006, 2450-2457, pp. 1-8.
Chen, et al., "A Self-Learning Worm Using Importance Scanning", ACM, 2005, pp. 1-8.
Jelasity, et al., "The Peer Sampling Service: Experimental Evaluation of Unstructured Gossip-Based Implementations*", 2001, pp. 1-21.
Jesi, et al., "A Secure Peer Sampling Service as a "Hub attack" countermeasure", May 2006, pp. 1-15.

(Continued)

*Primary Examiner* — Kevin C Harper
*Assistant Examiner* — Cassandra Decker
(74) *Attorney, Agent, or Firm* — Lee & Hayes, PLLC

(57) ABSTRACT

Sampling rules for information dissemination are described which may be applied in a system containing a number of nodes arranged into groups. A target address is selected using one of two methods: selection of an address from the entire address space of the system and selection of an address from a part of the address space which corresponds to set of groups of nodes. The set of groups of nodes is updated when information is successfully disseminated to a node at a target address selected using the first of the two methods. Rules to determine which of the two methods are used for any particular selection operation are also described.

15 Claims, 10 Drawing Sheets

OTHER PUBLICATIONS

Vojnovic, et al., "Sampling Strategies for Epidemic-Style Information Dissemination", Jul. 2007, pp. 1-15.
Xie, et al., "How Dynamic are IP Addresses?", ACM, 2007, pp. 1-12.
Zou, et al., "On the Performance of Internet Worm Scanning Strategies", 2007, pp. 1-16.
Hardy, et al., "Inequalities". Second Edition, Published by the Press Syndicate of the University of Cambridge, Cambridge, United Kingdom, 1988, pp. 16-19.
Gupta, et al., "Efficient Epidemic-style Protocols for Reliable and Scalable Multicast", In Proceedings of the 21st Symposium on Reliable Distribute Systems, 2002, pp. 1-10.
Kyasanur, et al., "Smart Gossip: Infusing Adaptivity into Gossiping Protocols for Sensor Networks*", Tech. Report. UIUC, Apr. 2006, pp. 1-25.

* cited by examiner

SAMPLING RULES FOR INFORMATION DISSEMINATION

BACKGROUND

There are many situations where it is necessary to disseminate information to network-connected devices, such as computers, PDAs, mobile telephones etc. The information to be disseminated may, for example, be a security patch, a news item, an alert etc. The dissemination may use a pull-based model, where a network-connected device connects to a network server to download the information, or the dissemination may use a push-based model, where a network server transfers the information to a network-connected device without a prior explicit request from that device.

In one example of a push-based model, an element in the network which possesses a particular piece of information may select a target address from the entire network address space at random and then push the piece of information to the target address. In another example, the underlying structure of the network (e.g. peer-to-peer overlays) may be used to assist the information dissemination.

The embodiments described below are not limited to implementations which solve any or all of the disadvantages of known dissemination methods.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Sampling rules for information dissemination are described which may be applied in a system containing a number of nodes arranged into groups. A target address is selected using one of two methods: selection of an address from the entire address space of the system and selection of an address from a part of the address space which corresponds to set of groups of nodes. The set of groups of nodes is updated when information is successfully disseminated to a node at a target address selected using the first of the two methods. Rules to determine which of the two methods are used for any particular selection operation are also described.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
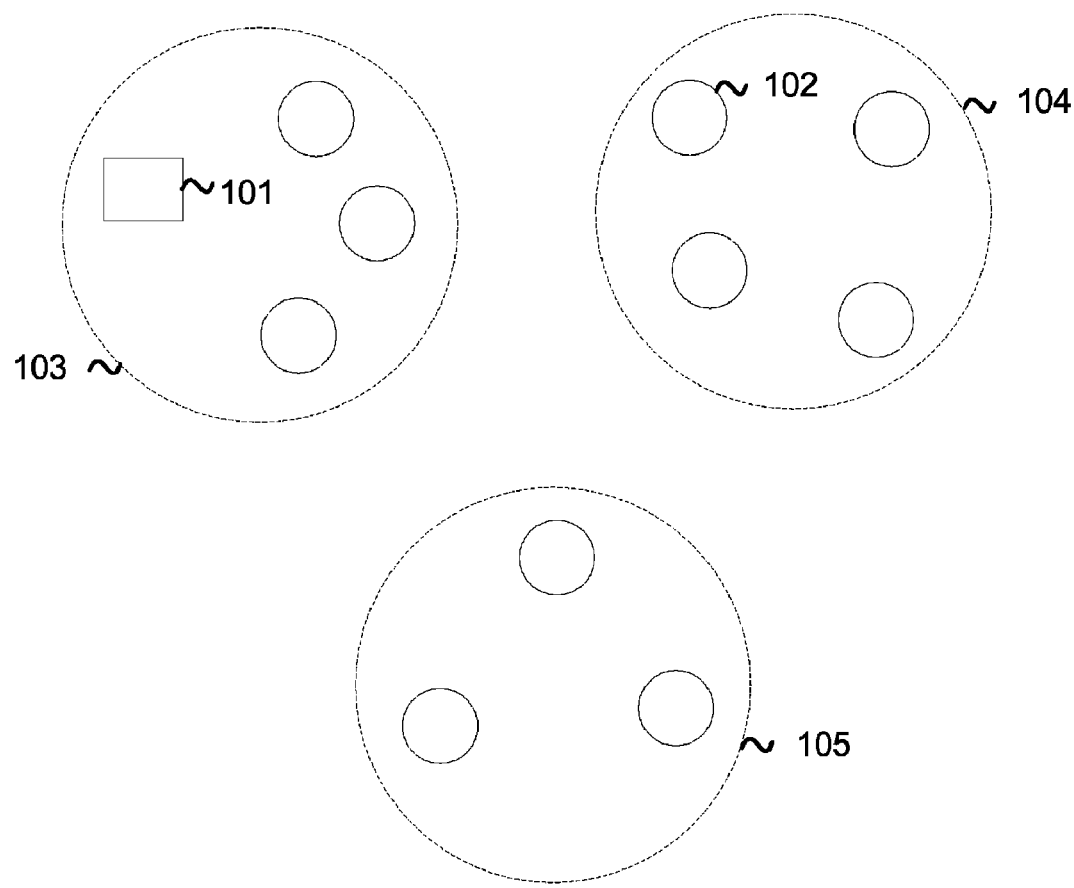
FIG. 1 is a schematic diagram of a system which comprises a number of nodes.
Figure 2:
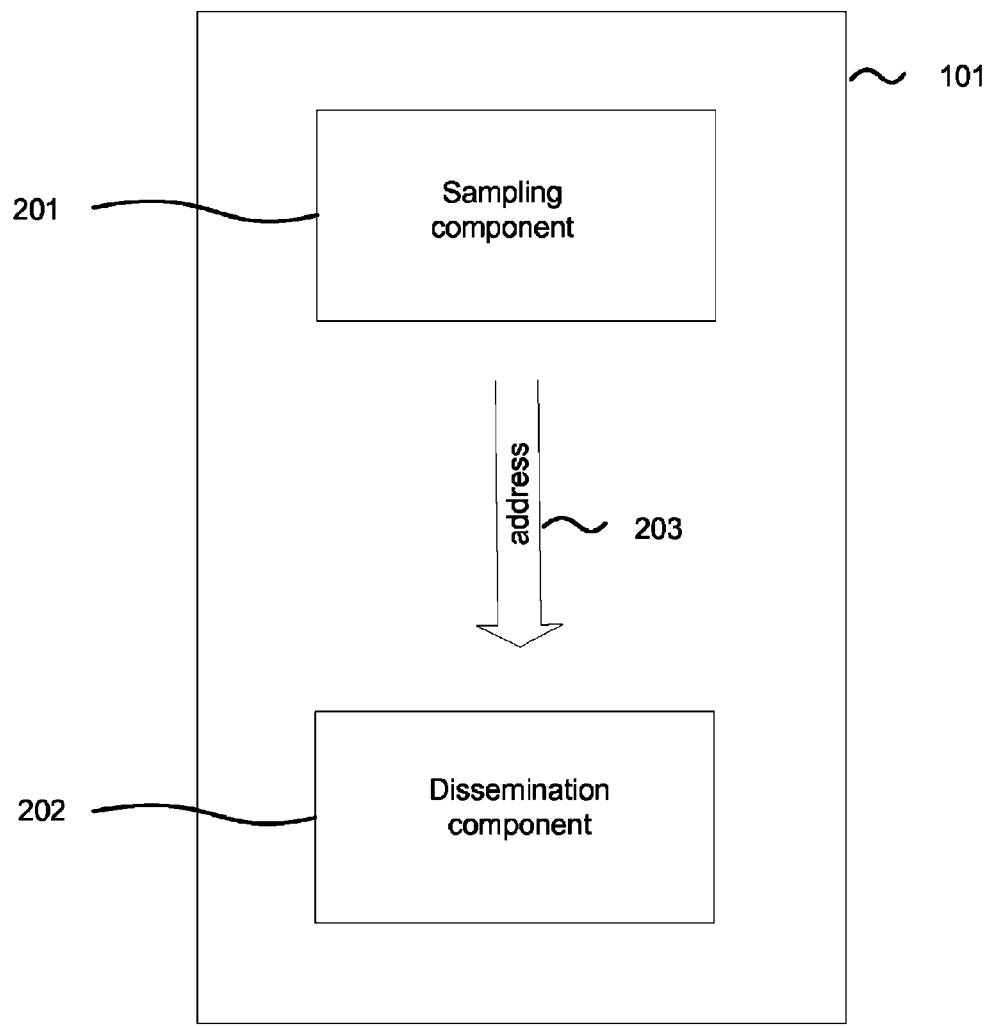
FIG. 2 is a schematic diagram of an initiator node.
Figure 3:
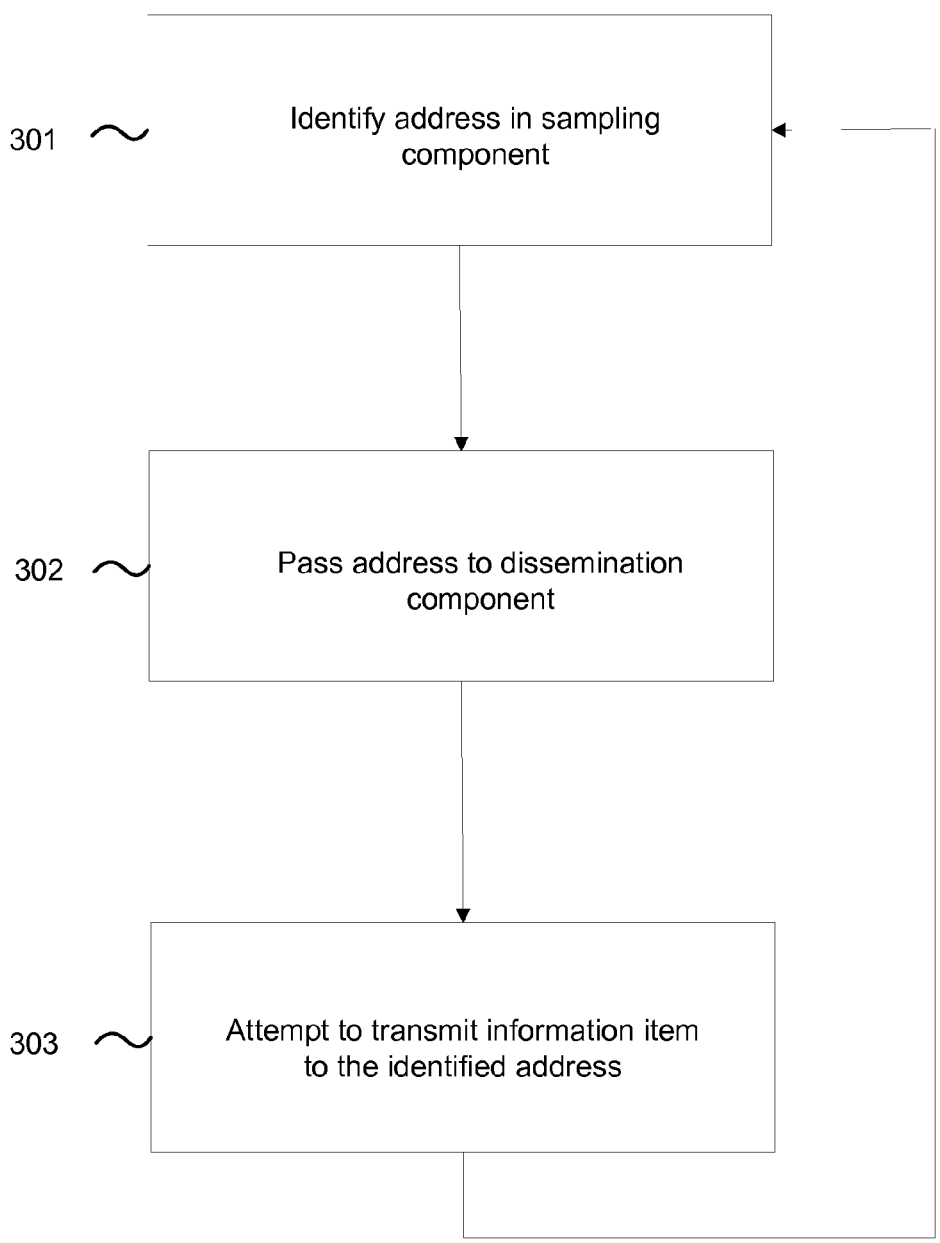
FIG. 3 is a flow diagram of a method of operation of an initiator node.

FIG. 1 is a schematic diagram of a system which comprises a number of nodes 101, 102 which are connected by a network (connections not shown in FIG. 1). These nodes are partitioned into groups 103-105 (as indicated by dotted lines). The system comprises one or more initiator nodes 101 (as indicated by a square), which initially possess the information to be disseminated and a number of target nodes 102 (as indicated by a circle). Each of the nodes in the system is identified by an address which falls within the entire address space of the system. An initiator node 101 is shown in more detail in FIG. 2 and its operation is shown in FIG. 3. The initiator node 101 comprises a sampling component 201 and a dissemination component 202. The sampling component 201 uses sampling rules to identify an address (block 301) which is then passed to the dissemination component 202 (block 302, as indicated in FIG. 2 by arrow 203). The dissemination component 202 then attempts to communicate the information item to the identified address (block 303) and if successful, the target node having the identified address which has now received the information item becomes an initiator node. The process is repeated by each initiator node in the system until all the nodes have received the information item, a defined proportion have received the information item, until a particular time or until any other defined condition is met.

The information dissemination process may be considered analogous to the process of epidemic disease spread and therefore a node which has the information item may be referred to as an 'infected node' (or 'infected host'), a node which is interested in receiving the information item but has not yet received it may be referred to as a 'susceptible node' (or 'susceptible host') and the defined proportion that need to receive the information item may be described as the 'target infection'.

The system shown in FIG. 1 may be any kind of system where nodes are arranged into groups. For example, the nodes may be computing devices identified by an IP (internet protocol) address, where the groups are IP subnets. In another example, the nodes may be mobile telephones, where the groups are identified by cell site or by telephone number. In a further example, the nodes may be distributed in physical space and identified by geographical coordinates. In this example, the groups correspond to geographical regions.

Different rules and strategies may be used by the sampling component 201 to identify the address (in block 301) which is then passed to the dissemination component (block 302). The following description describes various examples of sampling rules and strategies which may be used. It will be appreciated that aspects of the methods described below may be combined to provide yet further sampling rules and strategies.

Figure 4:
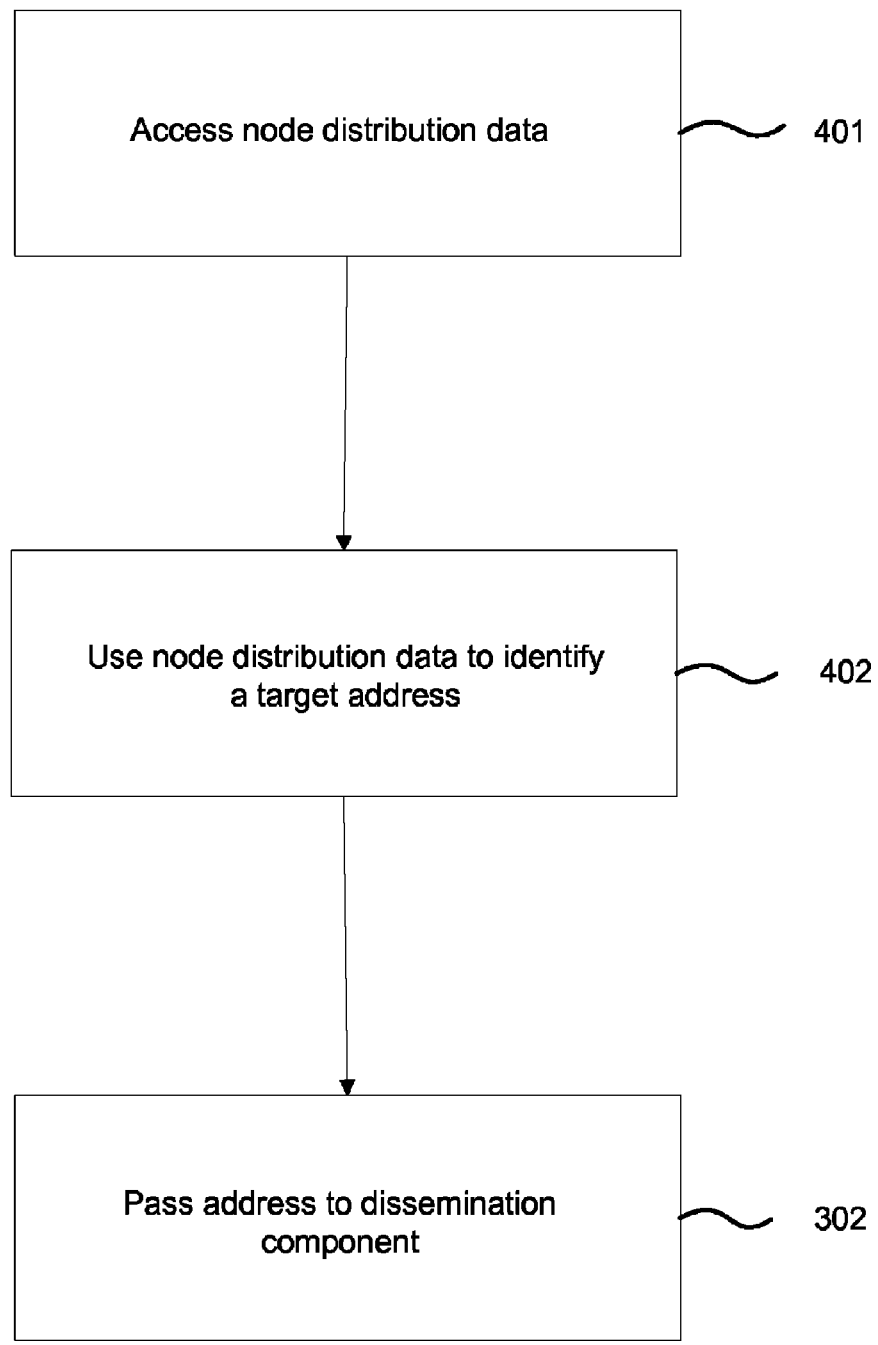
FIG. 4 shows an example flow diagram of the operation of the sampling component.

In an embodiment, the sampling component may use information about the distribution of nodes within the system in identifying a target address and FIG. 4 shows an example of the operation of the sampling component. The sampling component 201 accesses node distribution data (block 401) and then uses this data to identify a target address (block 402). The node distribution data describes the distribution of all initially susceptible nodes across the various groups within the system and may be defined in many different ways. If the initial number of infected nodes is negligible compared to the initial number of susceptible nodes, then the density of susceptible nodes and the density of all nodes are approximately the same. For example, the node distribution data may be the number of nodes per group or the density of nodes per group (e.g. the number of nodes in a group divided by the size of the address space of the group). In the example shown in FIG. 1, the number of nodes per group is {4,4,3}. If the address space of each of the groups shown in FIG. 1 contains 10 addresses, then the density of nodes per group is {0.4, 0.4, 0.3}.

The node distribution data may be stored in a central database which is accessible by each node or alternatively the node distribution data may be disseminated to each node (e.g. along with the information item itself).

Figure 5:
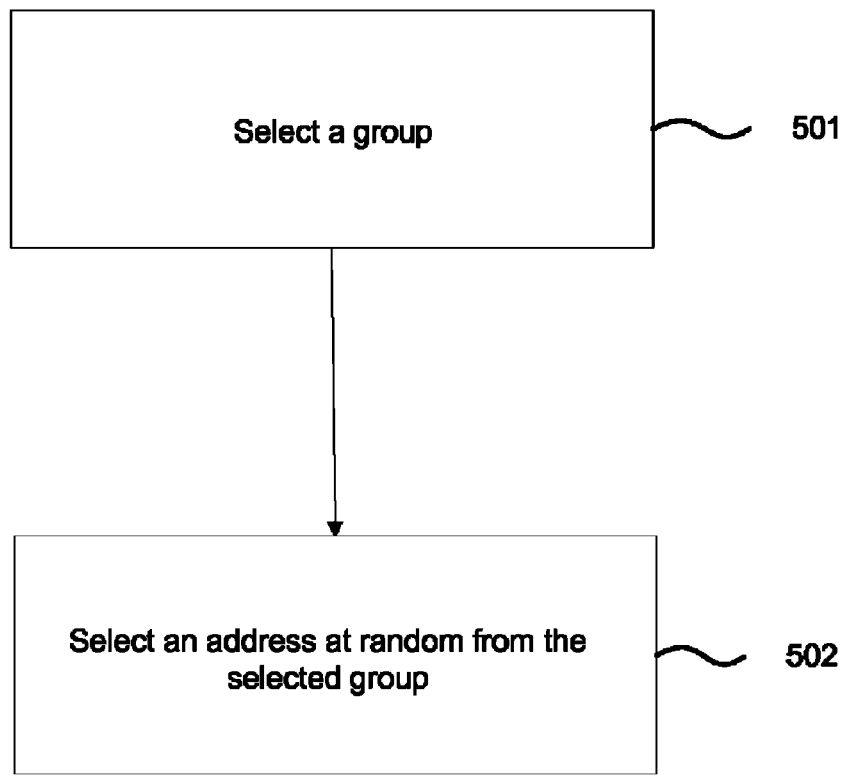
FIG. 5 shows one of the steps in the flow diagram of FIG. 4 in more detail.

In an example, the target address may be identified (in block 402) by selecting a group (block 501) and then randomly selecting an address from the selected group (block 502), as shown in FIG. 5. The group may be selected from all the groups or from a set of the groups which are initially the densest in terms of susceptible nodes and the group may be selected using a probability function. This probability function may be based on one or more of the following parameters: the fraction of the total address space occupied by a group and the initial density of susceptible nodes in a group.

A method of selecting a group is described below in detail, in which $\Omega$ is the size of the total address space (e.g. for IPv4, $\Omega=2^{32}$) and the address space is divided into J groups (which may also be referred to as 'subnets'), with each group j having an address space of size $\Omega_j$. Each group j comprises $N_j$ nodes which are interested in the information item (whether they have received it or not) of which $I_j(t)$ is the number of infected nodes at time t and $S_j(t)$ is the number of susceptible nodes at time t (where $S_j(t)=N_j-I_j(t)$. The total number of nodes in all groups which are interested in the information item is N. Normalized quantities may be defined as:

$$n_j = N_j/N$$

$$i_j(t) = I_j(t)/N$$

$$s_j(t) = S_j(t)/N$$

The total fraction of infected hosts is given by:

$$i(t) = \sum_{j=1}^{J} i_j(t)$$

The total fraction of susceptible hosts is given by:

$$s(t) = \sum_{j=1}^{J} s_j(t)$$

The fraction of the total address space occupied by group j is denoted $\omega_j$, where $\omega_j = \Omega_j/\Omega$. The groups are ordered in terms of their initial density of susceptible nodes (at time t=0), with the 1$^{st}$ group being the densest group and the j$^{th}$ group being the least dense group, i.e.:

$$\frac{S_1(0)}{\Omega_1} \geq \frac{S_1(0)}{\Omega_2} \geq \ldots \geq \frac{S_J(0)}{\Omega_J} \geq 0$$

As described above, an initiator node initially selects a group, samples an address lying in the selected group's address space uniformly at random (block 402) and then initiates a contact to the identified address (block 302). The group may be selected according to the following probability function:

$$p_j = \begin{cases} \alpha \omega_j \log \left( \dfrac{\frac{s_j^A(0)}{\omega_j^A}}{1 - \dfrac{i^0 - i(0)}{\sum_{k \in A} s_k(0)}} \right) & j \in A \\ 0 & j \notin A \end{cases} \quad (1)$$

where $\alpha$ is a normalization constant, $i^0$ is the target fraction of infected nodes, $i(0)$ is the initial fraction of infected nodes and A is the set of the J' most dense groups, i.e. groups $\{1, 2, \ldots J'\}$, where J' may be defined as:

$$J' = \max \left\{ j : \frac{s_j(0)}{\omega_j} \geq \frac{\sum_{k=1}^{j} s_k(0) - (i^0 - i(0))}{\sum_{k=1}^{j} \omega_k} \right\} \quad (2)$$

Also where, for j∈A:

$$s_j^A(0) = \frac{s_j(0)}{\sum_{k \in A} s_k(0)}$$

$$\omega_j^A(0) = \frac{\omega_j}{\sum_{k \in A} \omega_k}$$

Using the probability function of equation (1), the sampling targets the set A of initially densest groups. The optimal set A is defined by equation (2) and in this case, the initial density of susceptible nodes in every group in A is larger than the final density of susceptible nodes in A. After target infection is reached, the final density of susceptible nodes in A is given by:

$$\frac{\sum_{j \in A} S_j(t^0)}{\sum_{j \in A} \Omega_j} = \frac{\sum_{j \in A} S_j(0) - (I^0 - I(0))}{\sum_{j \in A} \Omega_j}$$

where $t^0$ is the time when the fraction of infected hosts $i^0$ is reached.

In another example of this method, the set A may be defined in a different manner to that given by equation (2) above, e.g. to make the set larger or smaller. In a further example, any other fixed distribution for sampling over groups (or subnets) may be used instead of equation (1).

The method described above reduces the total number of samplings which is required to achieve the target infection compared to random sampling over the entire address space. This therefore reduces the amount of network traffic caused by the sampling and reduces overall network congestion.

In some situations, information on the distribution of nodes within groups may not be available or may be incomplete/inaccurate. In another embodiment, the sampling component 201 may perform a local sampling strategy based on the observed successes and failures at that node, without using any information on the overall structure of the system.

Figure 6:
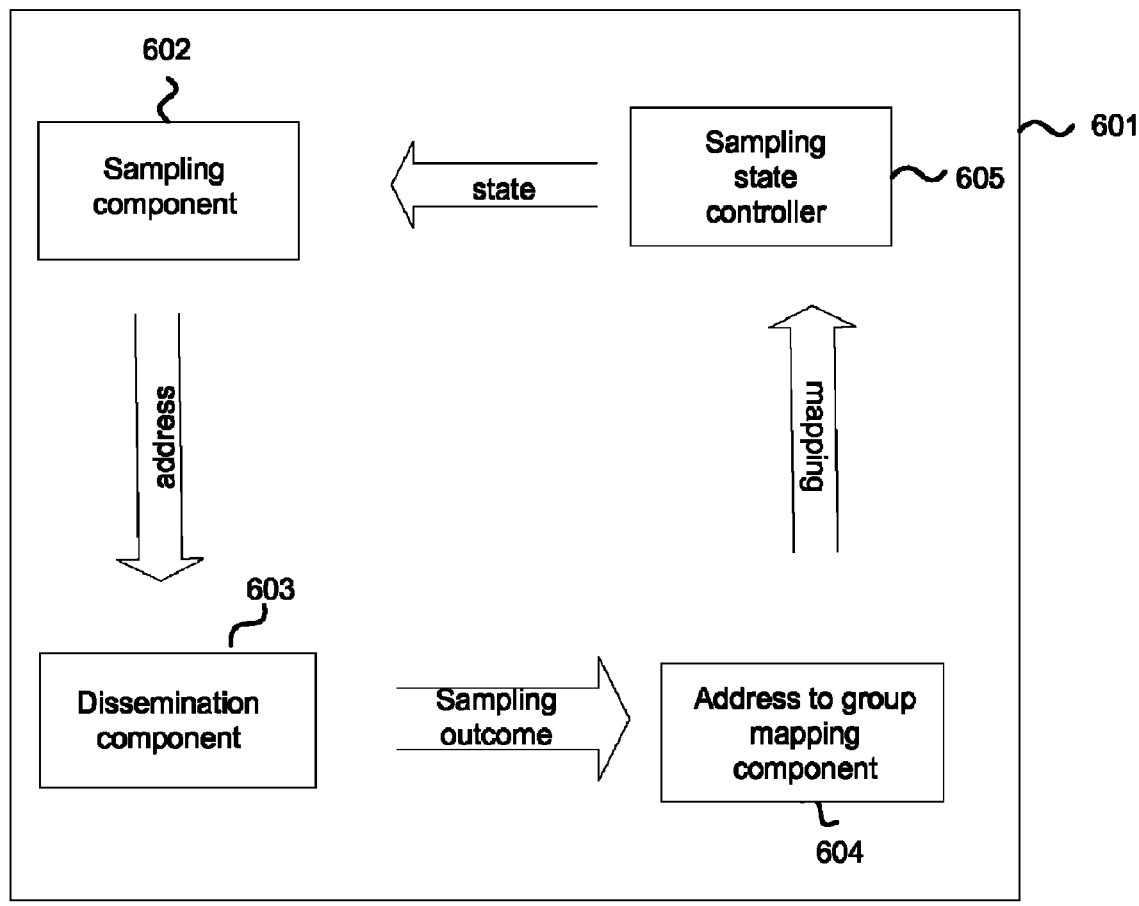
FIG. 6 is a second schematic diagram of an initiator node.

FIG. 6 shows a schematic diagram of an initiator node 601 which comprises a sampling component 602, a dissemination component 603, an address to group mapping component 604 and a sampling state controller 605. The sampling component 602 identifies an address using state information provided by the sampling state controller 605. The address is passed to the dissemination component 603 which attempts to transmit the information item in question to the identified address. Data identifying whether this attempt was successful or not is passed by the dissemination component 603 to the group mapping component 604. A success is defined as when the initiator node is able to transmit the information item to a susceptible node. A failure is defined as when the initiator node is unable to transmit the information to a susceptible node. This may be because there is no node at the identified address or because the node which has the identified address is an infected node (and is therefore not a susceptible node). Where there is a node at the identified address, but the node is not interested in the particular information, then the node is not a susceptible node and is not considered within the system (i.e. it is the same as there being no node at the given address). The group mapping component 604 determines the group to which the identified address corresponds and provides this mapping and details of the sampling outcome to the sampling state controller 605. The sampling state controller 605 updates its state information based on the data received from the group mapping component 604.

Figure 7:
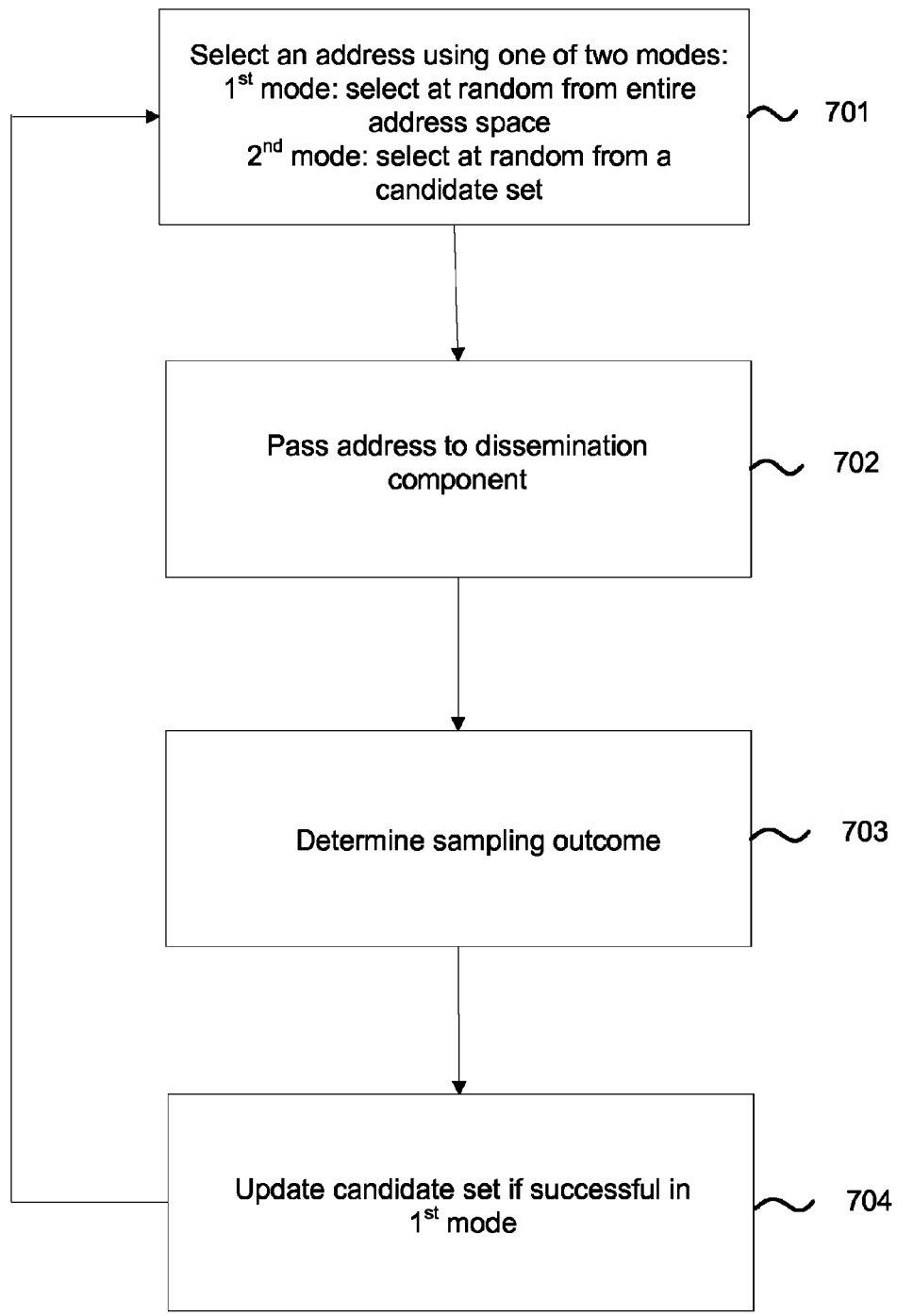
FIG. 7 is a flow diagram of a method of operation of the initiator node shown in FIG. 6.

The operation of the initiator node 601, and in particular the operation of the sampling component 602, is also shown in the flow diagram of FIG. 7. The sampling component 602 selects an address using one of two modes: a first mode in which an address is selected from the entire address space, and a second mode in which an address is selected from a candidate set (block 701). In an embodiment, in the first mode an address is selected at random from the entire address space and in the second mode an address is selected at random from the candidate set may be performed at random. In other embodiments, other selection methods may be used to select an address from either the entire address space (in the first mode) or the candidate set (in the second mode). The candidate set may comprise one or more groups from the system and data identifying the candidate set is held as state information by the sampling state controller 605. There are a number of different methods to determine which mode is used at any particular time and two specific examples are described in more detail below and referred to as 'K-Fail' and 'K-Cand-Set'. Once an address has been identified, this is passed to the dissemination component (block 702) which attempts to transmit the information item to the identified address. The sampling outcome is determined by the dissemination component (block 703) and the candidate set is updated if the sampling is successful when operating in the first mode, i.e. the mode in which an address is selected at random from the entire address space, (block 704). The method is then repeated and for successive samplings, the same or a different mode may be used, as described in more detail below.

As described above, state information provided by the sampling state controller 605 is used in the selection of an address by the sampling component 602 and/or in determining when the sampling component switches between sampling modes. The state information used depends on the specific implementation (see the examples described below), but may comprise one or more of: details of the candidate set, the K parameter, the q parameter and a failure count.

Whilst FIG. 6 shows four separate elements 602-605, in some examples the functionality of some or all of these elements may be combined. For example, the mapping component 604 and the sampling state controller 605 may be combined into a single element which performs the mapping and the updating and storing of the candidate set. These functional elements may be implemented in software, hardware, firmware or any other manner.

Figure 8:
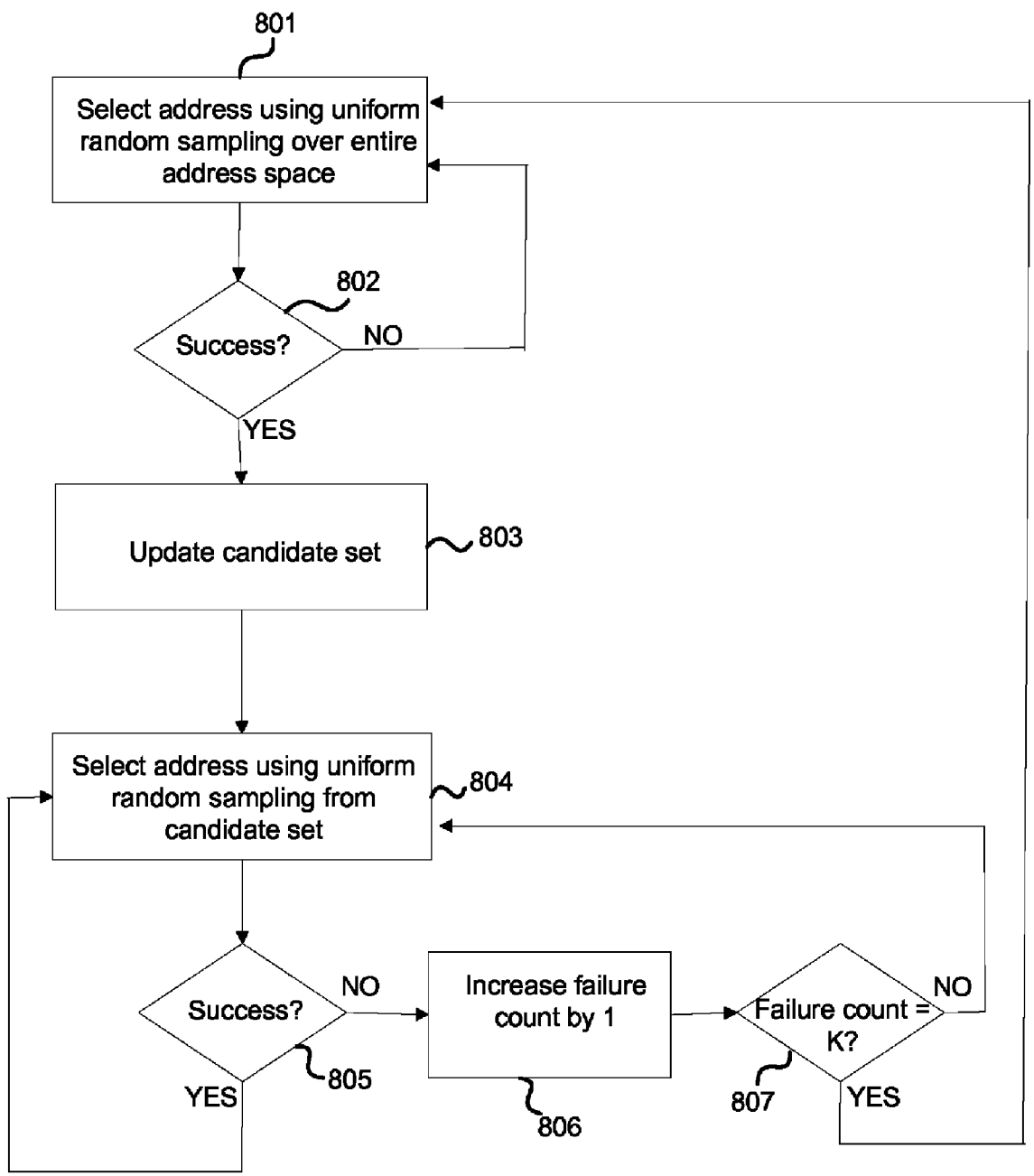
FIGS. 8 and 9 are flow diagrams of example sampling strategies.

FIG. 8 shows a flow diagram for the 'K-Fail' sampling strategy. This technique biases to groups from which nodes observe successful samplings (where success/failure is as defined above). The node keeps a count of sampling failures and switches between the two modes when the count reaches a threshold value. This threshold value is defined as a configuration parameter K, where $K \geq 1$. This configuration parameter K may be the same throughout the system (i.e. a system-wide parameter) or may be different for different nodes (i.e. a node specific parameter). The K-Fail strategy is described in more detail below.

Initially, an infected node may select an address using uniform random sampling or any other fixed distribution, i.e. the first mode, (block 801). For the purposes of the following description, uniform random sampling will be used by way of example only. If the sampling in the first mode (e.g. using uniform random sampling) is not successful ('No' in block 802), the sampling is repeated (block 801). When a node that performed uniform random sampling successfully samples a node ('Yes' in block 802), it updates its candidate set (which may initially be empty) to include the group which includes the successfully sampled node (block 803). At this point the selection method changes from the first mode to the second mode, and the selection of an address is now performed using uniform random sampling (or other fixed distribution) from the candidate set (block 804). If the sampling from the candidate set is successful ('Yes' in block 805), the sampling continues from the candidate set (block 804). If the sampling using uniform random sampling from the candidate set is not successful ('No' in block 805), the failure count is increased by one (block 806). If the resultant failure count does not equal the threshold ('No' in block 807), another sampling is performed using uniform random sampling from the candidate set (block 804). Once the failure count equals the threshold value, K, ('Yes' in block 807), the selection method switches back to the first mode from the second mode and sampling continues using selection by uniform random sampling from the entire address space (block 801).

It will be appreciated that whilst uniform random sampling from either the entire address space or the candidate set is described above, this is by way of example only and in other examples, any fixed distribution may be used to sample from the entire address space (in the first mode) or from the candidate set (in the second mode).

In an example, the candidate set may comprise just one group. This means that on updating the candidate set (in block 803) any existing group in the candidate set is replaced with the group that includes the node that was successfully sampled using the first mode (block 801 followed by 'Yes' in block 802). Where the candidate set comprises more than one group, on updating the candidate set, the group which includes the nodes that was successfully sampled using the first mode is added to the candidate set (if it is not already within the candidate set) and another group within the candidate set is evicted. The candidate set which is evicted may be selected at random from those groups in the candidate set or may be selected based on other factors. In an example, in addition to the cumulative failure count (which is incremented in block 806), a failure count may be maintained for each group within the candidate set. When the candidate set is updated (in block 803), the group with the highest failure count may be evicted. Other possible methods of selecting a group from the candidate set for eviction are described below.

In another example, where the candidate set includes more than one group (or subnet), a separate failure count may be maintained for each group. The switch between modes may then occur when the failure count for one of the groups exceeds the threshold K or when the sum of the failure counts for each group exceeds the threshold K.

When an infected node begins the information dissemination process, its candidate set may initially be empty. Alternatively, its candidate set may be inherited from the node that infected it or may be populated using any other policy.

The dynamics of the K-Fail strategy can be described in the following set of differential equations which capture the transitions of node states. Each infected node is in one of K states: 0 denoting the state in which the node performs uniform random sampling (referred to as the first mode above) or state k where K−k denotes the number of successive failures that the node has already incurred, where k=1, . . . , K (and the node is operating in the second mode). The fraction of infected nodes that are in state 0 is denoted $r_0$ and the fraction of infected nodes in a group j that are in state k is denoted $r_{j,k}$.

$$\frac{d}{dt}s_j = -\beta\left(\omega_j r_0 + \sum_{k=1}^{K} r_{j,k}\right)\frac{s_j}{\omega_j}$$

$$\frac{d}{dt}r_0 = \sum_{i=1}^{J} r_{i,1}\left(1 - \beta\frac{s_i}{\omega_i}\right) - (1-q)r_0\beta\sum_{i=1}^{J} s_i$$

$$\frac{d}{dt}r_{j,k} = -r_{k,j} + r_{k+1,j}\left(1 - \beta\frac{s_j}{\omega_j}\right), 1 \leq k < K$$

$$\frac{d}{dt}r_{j,K} = -r_{j,K} + 2\left(r_0\beta s_j + \beta\frac{s_j}{\omega_j}\sum_{k=1}^{K} r_{j,k}\right).$$

Figure 9:
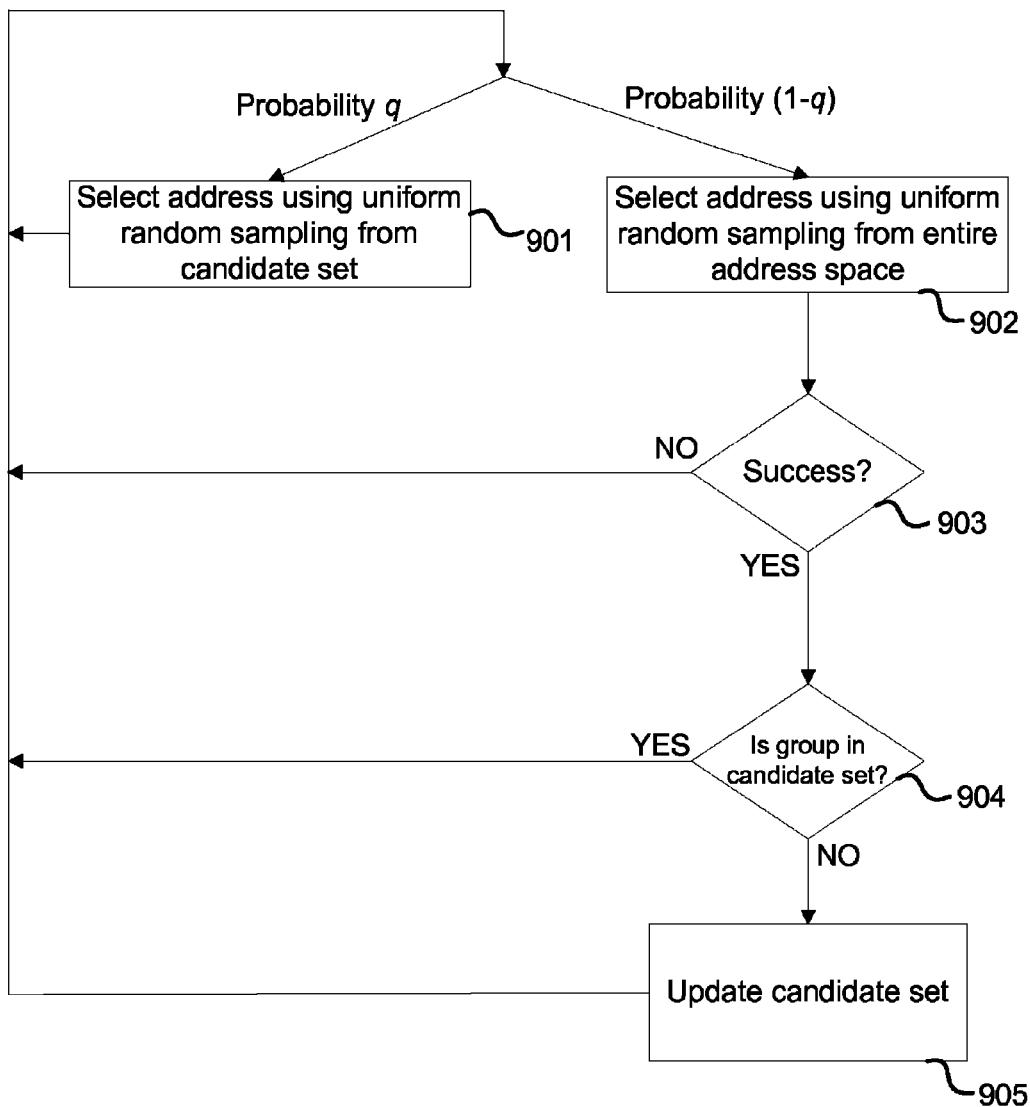

FIG. 9 shows a flow diagram for the 'K-CandSet' sampling strategy. In this technique, each node maintains a candidate set of at most K groups, where K is an integer and K≧1. Each node splits its sampling effort between sampling groups from its candidate set (the second mode) and sampling from the entire address space (the first mode). Uniform random sampling may be used in the second mode or any fixed distribution. The value of K may be the same for all nodes in the system or may be different for different nodes. This strategy is described in more detail below and for the following example, uniform random sampling within the second mode is described by way of example only.

Initially an infected node may set its candidate set according to a policy. It may, for example, initially be empty or a node may inherit the candidate set from the node which infects it (e.g. the details of the candidate set may be transmitted along with the information item itself). With a probability q, a node samples a group by picking an address uniformly at random from its candidate set, i.e. the second mode (block 901). This selection may be a two step process (e.g. select a group, select and address from that group) or a one step process (e.g. select an address from any groups in the candidate set) and for K=1, these two processes are the same. Otherwise (probability 1−q) the node samples by uniform random sampling of the entire address space, i.e. the first mode (block 902). If, when sampling by uniform random sampling of the entire address space (i.e. in the first mode), sampling is successful ('Yes' in block 903), and the group in which the successfully sampled node resides is not in the candidate set ('No' in block 904), then the candidate set is updated to include this particular group (block 905). When the candidate set is updated, if the current size of the candidate set is smaller than K, the group is added to the set. However, if the current size of the candidate set is equal to K, the group is added to the set in place of another group which is evicted. The group which is selected for eviction may be selected at random or based on other factors. An example eviction strategy is described above with reference to K-Fail and may also be applied to K-CandSet. Other eviction strategies are described below. The process is then repeated with the selection mode again being chosen again for the next sampling as described above (i.e. the first mode is selected with probability 1-q and the second mode is selected with probability q).

The configuration parameter q may take values according to: 0≦q<1. Typically the value of q is close to one (e.g. 0.95) such that in the majority of cases an address is selected using uniform random sampling from the candidate set (the second mode) and in only a small number of cases an address is selected uniformly random sampling from the entire address space (the first mode). The value of q is typically fixed, but in other examples, the value of q may be variable. The value of q may be the same for all nodes or may be different for different nodes.

The size of the candidate set, K, may take any value greater than, or equal to, one. Typically the value of K is small and may be equal to one. The value of K may be selected for a particular system based on the population distribution within the system. For example, at time t, K may be in the order of the inverse of the density of susceptible hosts at time t (e.g. of the order of $\Omega_j/S_j(t)$). The value of K may be adjusted to optimize the sampling for a particular embodiment.

The dynamics of the K-CandSet sampling strategy can be described by the following set of differential equations. These equations relate to the specific case of K=1 by way of example only. The fraction of infected nodes of type k, i.e. nodes with the candidate set {k}, is denoted $r_k$ and the fraction of infected nodes of type 0, i.e. with an empty candidate set, is denoted $r_0$.

$$\frac{d}{dt}s_j = \beta\left((1-q)\omega_j\sum_{k=0}^{J}r_k + q(\omega_j r_0 + r_j)\right)\frac{s_j}{\omega_j}$$

$$\frac{d}{dt}r_0 = -r_0\sum_{k=1}^{J}\beta s_k$$

$$\frac{d}{dt}r_j = 2(1-q)\left(\sum_{k=1}^{J}r_k\right)\beta s_j + 2\beta r_0 s_j + r_j\left(q\beta\frac{s_j}{\omega_j} - (1-q)\sum_{k=1}^{J}\beta s_k\right)$$

As described above for both K-Fail and K-CandSet, where K>1, it may be necessary to select a group from the candidate set for eviction when the candidate set is updated (in blocks 803 and 905). Possible eviction strategies include using history of previous failures and/or successes, however this does increase the size of the state which is stored at the node. Where this history is used, the history may be collated locally at the node and/or may be shared between nodes. Sharing information between nodes provides a better estimate of group population (and therefore enables more informed selection of a group for eviction from the candidate set) but increases the data which needs to be communicated between nodes and increases the amount of state information which is held at each node. Where there is limited memory at the node, use of only a small amount of state information is beneficial. Use of only a small amount of state information also reduces the overhead of processing and storing the state information.

The methods described above with reference to FIGS. 6-9 reduce the number of samplings that are required to reach a predetermined fraction of nodes, compared to uniform random sampling, without requiring any prior knowledge of the partitioning of nodes into groups within the system. This therefore reduces the amount of network traffic caused by the sampling and reduces overall network congestion. The methods also require only a small amount of state information.

Whilst the above description describes various different methods for selection of a target address (block 301), aspects of the different methods described may be combined to create further methods. For example, the local sampling strategy may be combined with use of some data on the overall structure of the system. In an example, this information on the overall structure (which may, for example, comprise node distribution data), may be used to determine which groups are evicted from the candidate set.

Figure 10:
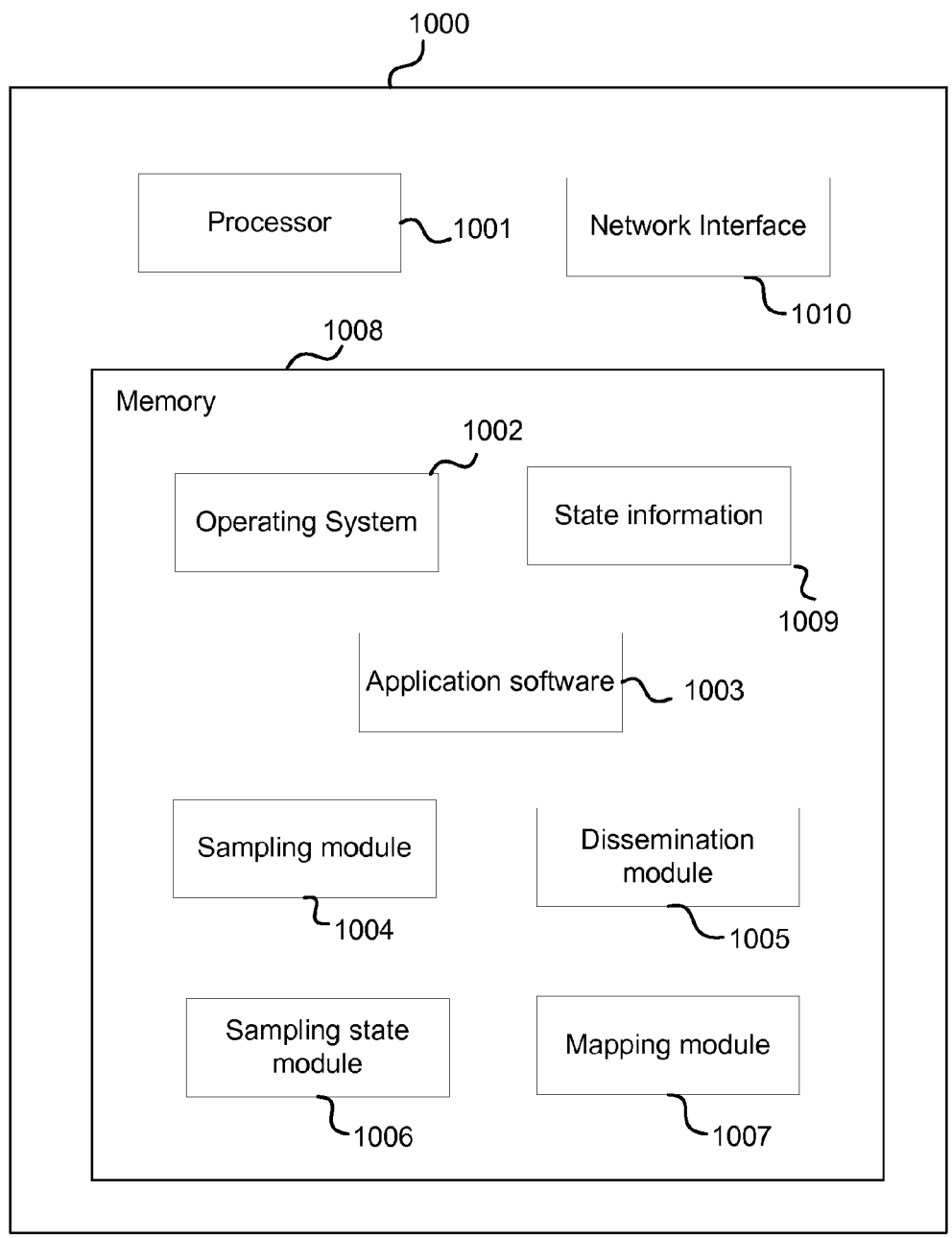
FIG. 10 illustrates an exemplary computing-based device in which embodiments of the sampling strategies described herein may be implemented.

As described above, each node in the system may comprise a computing-based device (or computer) which may, for example, be a PC, a server, a mobile telephone, a PDA etc. Different nodes within the system may be devices of different types (e.g. the system may comprise mobile telephones, PDAs, servers and PCs). FIG. 10 illustrates various components of an exemplary computing-based device 1000 which may be implemented as any form of a computing and/or electronic device, and in which embodiments of the sampling strategies described above may be implemented.

Computing-based device 1000 comprises one or more processors 1001 which may be microprocessors, controllers or any other suitable type of processors for processing computing executable instructions to control the operation of the device in order to disseminate information using one of the sampling strategies described herein.

Platform software comprising an operating system 1002 or any other suitable platform software may be provided at the computing-based device to enable application software 1003 and any other software 1004-1007 to be executed on the device. This software may be provided in the form of computer executable instructions which may be provided using any computer-readable media, such as memory 1008. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

Software modules 1004-1007 may be provided to perform the functions of the elements described above, e.g. a sampling module 1004, a dissemination module 1005, a sampling state module 1006 and a mapping module 1007. Alternatively, these functions may be performed in hardware or firmware. Where the computing-based device performs the method as described above and shown in FIG. 4, such modules may not be required and/or alternative modules may be required.

The memory 1008 may also be used to store other information, such as node distribution data (not shown in FIG. 10) and/or state information 1009. This state information may be written by the sampling state module 1006 (or any other implementation of the sampling state controller 605 shown in FIG. 6).

The computing-based device 1000 may also comprise a network interface 1010. This interface is used to communicate with other nodes in the system (e.g. to receive and then subsequently to disseminate the information item) and/or to access centrally stored information (e.g. to access node distribution data as in block 401 of FIG. 4). This centrally stored information may be copied to the computing-based device 1000 and stored in memory 1008. Any suitable networking technology may be used (e.g. IP, cellular technology etc) and a system may comprise different nodes which communicate using different technologies.

The computing-based device may also comprise one or more inputs which are of any suitable type for receiving media content, Internet Protocol (IP) input etc. One or more outputs may also be provided such as an audio and/or video output to a display system integral with or in communication with the computing-based device. The display system may provide a graphical user interface, or other user interface of any suitable type although this is not essential.

The methods described above are flexible because they can be applied to many different types of networks and are not dependent on a particular network technology. Although the present examples are described and illustrated herein as being implemented in a system as shown in FIG. 1, the system described is provided as an example and not a limitation. As those skilled in the art will appreciate, the present examples are suitable for application in a variety of different types of systems and networks.

The sampling strategies are described above for use in information dissemination. This is just one example application for the strategies described. In another example, the sampling strategies may be used to characterize the performance of worm propagation strategies, where the information item corresponds to worm-like malicious software.

Whilst in the above description, the entities within the systems are referred to as 'nodes', they may alternatively be referred to as 'hosts'. The groups of nodes may alternatively be referred to as 'subnets'.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of selecting addresses to which to disseminate information in a system, the system comprising a plurality of nodes arranged into groups, and the method comprising:
    selecting, by a processor, addresses from an address space associated with the system using one of a first selection mode and a second selection mode, wherein the first selection mode comprises selecting an address from the entire address space and wherein the second selection mode comprises selecting an address from a portion of the address space corresponding to a candidate set of at least one group of nodes in the system; and
    updating the candidate set if an address selected using the first mode corresponds to a node requiring the information; and
    switching from the first selection mode to the second selection mode on the selection of the address using the first mode that corresponds to the node requiring the information.

2. The method according to claim 1, wherein the first selection mode comprises randomly selecting an address from the entire address space and wherein the second selection mode comprises randomly selecting an address from the candidate set.

3. The method according to claim 1, wherein each group is associated with a subset of the address space and wherein the candidate set comprises at least one subset.

4. The method according to claim 3, further comprising:
    incrementing a failure counter on selection of an address using the second mode that does not correspond to a node requiring the information.

5. The method according to claim 4, further comprising:
    switching from the second selection mode to the first selection mode when the failure counter equals a threshold value.

6. The method according to claim 3, wherein selecting addresses from an address space associated with the system using one of a first selection mode and a second selection mode comprises:
    using the second selection mode with a probability defined by a probability parameter; and
    using the first selection mode when the second selection mode is not used.

7. The method according to claim 3, wherein updating the candidate set comprises:
    identifying a group corresponding to said node; and
    updating the candidate set to include the subset associated with said group.

8. The method according to claim 7, wherein updating the candidate set further comprises:
    removing a subset associated with another group from the candidate set.

9. A system comprising:
    a processor in communication with a memory;
    a sampling component, stored in the memory, to select a target address for information dissemination using one of a first selection mode and a second selection mode, wherein the first selection mode comprises selecting an address from an address space associated with the system and wherein the second selection mode comprises selecting an address from a portion of the address space corresponding to a candidate set of at least one group of nodes in the system;
    a dissemination component, stored in the memory, to transmit an item of information to the target address; and
    a sampling state controller to update the candidate set upon successful transmission of the item of information to a target address selected using the first selection mode;
    wherein the sampling component switches from the first selection mode to the second selection mode on successful transmission of the item of information to the target address selected using the first selection mode.

10. The system according to claim 9, wherein the first selection mode comprises randomly selecting an address from an address space associated with the system and wherein the second selection mode comprises randomly selecting an address from the portion of the address space corresponding to the candidate set of at least one group of nodes in the system.

11. The system according to claim 9, wherein the dissemination component determines if an attempt to transmit an item of information to the target address is successful.

12. The system according to claim 9, further comprising:
a mapping component to identify a group of nodes comprising the target address.

13. The system according to claim 12, wherein the sampling state controller updates the candidate set to include the identified group of nodes.

14. The system according to claim 9, wherein the sampling component uses the second selection mode with a defined probability or uses the first selection mode.

15. A method of selecting addresses to which to disseminate information in a system, the system comprising a plurality of nodes arranged into groups, and the method comprising:
accessing node distribution data using a processor; and
using the node distribution data to select by the processor a target address by selecting a group using a probability function, and selecting the target address at random from a range of addresses associated with the group,
wherein the probability function comprises:

$$p_j = \begin{cases} \alpha \omega_j \log\left(\dfrac{\dfrac{s_j^A(0)}{\omega_j^A}}{1 - \dfrac{i^0 - i(0)}{\sum_{k \in A} s_k(0)}}\right) & j \in A \\ 0 & j \notin A \end{cases}$$

where:
α is a normalization constant,
ρ is a target fraction of infected nodes,
i(0) is an initial fraction of infected nodes,
A is the set of most dense groups, $$s_j^A(0) = \frac{s_j(0)}{\sum_{k \in A} s_k(0)},$$

$$\omega_j^A(0) = \frac{\omega_j}{\sum_{k \in A} \omega_k},$$

$\omega_j$ is the range of addresses associated by group j divided by a sum of the ranges for all groups, and
$s_j(t)$ is a normalized number of susceptible nodes at time t.

* * * * *